United States Patent [19]

Marks

[11] 4,433,248
[45] Feb. 21, 1984

[54] CHARGED AEROSOL WIND/ELECTRIC POWER GENERATOR WITH SOLAR AND/OR GRAVITATIONAL REGENERATION

[76] Inventor: Alvin M. Marks, 166-35 Ninth Ave., Whitestone, N.Y. 11357

[21] Appl. No.: 366,139

[22] Filed: Apr. 7, 1982

[51] Int. Cl.³ .............................. H02N 1/00
[52] U.S. Cl. ..................... 290/44; 290/55; 310/10; 310/11; 322/2 A
[58] Field of Search ............... 290/44, 55; 310/10, 310/11, 308, 309; 322/2 A; 55/2, 107, 135, 139, 146, 151, 154

[56] References Cited

U.S. PATENT DOCUMENTS

| | | | |
|---|---|---|---|
| 3,191,077 | 6/1965 | Marks et al. | 310/11 X |
| 3,411,025 | 11/1968 | Marks | 310/11 |
| 3,417,267 | 12/1968 | Marks | 310/11 X |
| 3,456,135 | 7/1969 | Marks | 310/10 |
| 3,518,461 | 6/1970 | Marks | 310/10 |
| 3,792,293 | 2/1974 | Marks | 310/11 X |
| 4,206,396 | 6/1980 | Marks | 322/2 A |
| 4,395,648 | 7/1983 | Marks | 310/10 |

Primary Examiner—J. V. Truhe
Assistant Examiner—Terry Flower

[57] ABSTRACT

On a Charged Aerosol Wind/Electric Power Generator, electrically charged water droplets are dispersed into the wind stream. Using Induction Electric Charging, a water jet issues under water pressure from a small diameter (25–50 $\mu$m) orifice, and the jet breaks into charged droplets. A plate orifice 35 $\mu$m diameter, and 25 $\mu$m long appears optimum; a single jet from such an orifice at a water pressure of 15 psig produces net electric power output substantially exceeding the hydraulic and electric power inputs. A practical Wind/Electric Generator utilizes a multi-orifice array scaled to a kilowatt or megawatt level. A water recovery and pressure regeneration solar and/or gravitational means is described by which water is conserved and the water power is free, so that there is a net output electric power without external power input of any kind, except natural wind and/or solar power.

17 Claims, 8 Drawing Figures

4,433,248

CHARGED AEROSOL WIND/ELECTRIC POWER GENERATOR WITH SOLAR AND/OR GRAVITATIONAL REGENERATION

BACKGROUND OF THE INVENTION

On a Charged Aerosol Wind/Electric Power Generator, electrically charged water droplets are dispersed into the wind stream. Using Induction Electric Charging, a water jet issues under water pressure from a small diameter (25–50 $\mu$m) orifice, and the jet breaks into charged droplets. A plate orifice 35 $\mu$m diameter, and 25 $\mu$m long appears optimum, a single jet from such an orifice at a water pressure of 15 psig produces net electric power output substantially exceeding the hydarulic and electric power inputs. A practical Wind/Electric Generator utilizes a multi-orifice array scaled to a kilowatt or megawatt level. A water recovery and pressure regeneration solar and/or gravitational means is described by which water is conserved and the water power is free, so that there is a net output electric power without external power input of any kind, except natural wind and/or solar power.

This invention is an improvement over U.S. Pat. No. 4,206,396, issued June 3, 1980, entitled "Charged Aerosol Generator with Uni-Electrode Source". The Government has rights in this invention pursuant to Contract No. DEAC02-78 ER04985 awarded by the U.S. Department of Energy. The state of the art is given in a previous report[1]. In this report, Method 4.1 was employed to produce the charged aerosol[2]. In this method, water under pressure is forced through a micro-orifice to form a charged aerosol in the presence of an electric field and dispersed in the wind. In most cases, the water power utilized is a small proportion of the electric power output.

The present invention relates to a method of obtaining the water pressure utilizing solar power. A further advantage of this invention is that the water supply is heated even in the winter so that ice will not form as long as the system is in operation.

Further, utilizing a modification of this system, Method 3 may be employed to form a charged aerosol by condensation, again utilizing micro-orifices to limit the steam flow. An advantage of the Condensation Method is that a smaller amount of water is employed because the charged droplets produced are very much smaller in diameter[2] for the same electric charges.

DESCRIPTION OF THE FIGURES

Referring to FIG. 1 there is shown a diagram of an embodiment of this invention. In this embodiment the sun heats the water to a temperature sufficient to avoid the freezing of the water in cold weather which would make the device inoperable. Water flows from an elevated reservoir 1, for example a natural elevated body of water such as a lake, via a pipe 2 to a solar collector panel 3. The solar collector 3 may be flat and at ground level near the power fence. In the solar panel 3 the sun's rays 4 heat the water to a suitable temperature. The heated water flows from the solar panel 3 to a thermally insulated storage chamber 5 and thence via pipe 6 to the micro-orifices 7, under a net pressure head h. The pipe 6 is thermally insulated to minimize heat loss. To avoid discharging the power fence to ground, the pipe 6 is also electrically insulated. The wind 11 entrains and drives the charged aerosol droplets 12. The charged aerosol droplets 12 eventually discharge to ground at 13 and complete the circit through the load 14 back to the power fence 10; whereby the wind power is transduced to electric power supplied to the load 14.

FIG. 2 shows a diagram of a second embodiment of this invention in which the power fence functions without the application of external power, except sun heat power. A boiler feed water pump 15 supplies water 16 to the boiler 17 from a ground level water source 18. Sunlight 4 is focused by a curved cylindrical reflector 19 onto boiler 17 and superheater 22 which are located at the linear focus of the reflector. Water 16 in the boiler 17 is converted to steam 20. The steam 20 from the boiler 17 flows through superheater 22 in which superheated steam 21 is formed which flows via insulated pipe 23 to condense at an upper level in the air-cooled condenser 24; thus converting the sun heat power to gravitational potential power. The condensed water 25 flows into the reservoir 1 which provides water at a pressure head h to the microorifices 7. Electric power is saved which otherwise would have to be withdrawn from the power fence 10 to supply water pumped under pressure to the orifices.

FIG. 3 shows a diagram of a third embodiment of this invention utilizing the Condensation Method 3. Superheated steam 21 is produced near ground level. The superheated steam 21 flows through an insulating pipe 23 to the emitter 26 from which there issues a supercooled steam jet 28. A potential source 9 connected between emitter 26 and point exciter electrodes 27 injects ions into the supercooled steam jets 28, thus forming the charged aerosol 12 of singly charged droplets about 200 Å diameter[2].

Figure 1:
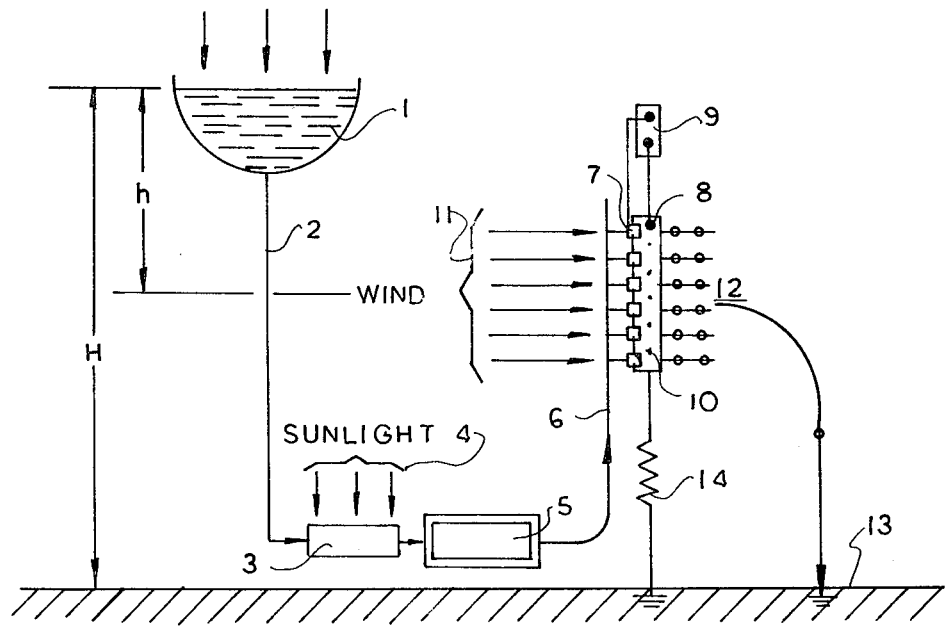
FIG. 1 shows a diagram of a Charged Aerosol Wind/Electric Power Generator also known as a "power fence" using an induction charging source employing water under pressure from a reservoir elevated above the generator and a solar panel for heating the water supplied to the charging source.
Figure 2:
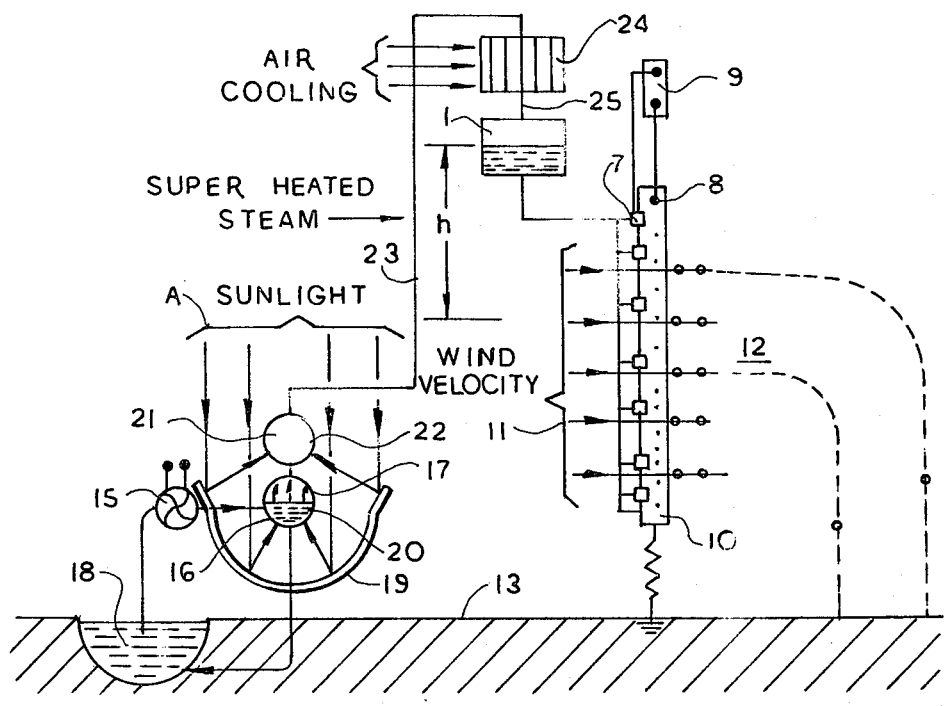
FIG. 2 shows a diagram of a Charged Aerosol Wind/Electric Power Generator using an induction charging source employing water under pressure from a reservoir elevated above the generator, using a solar steam boiler and a condenser to provide water to the reservoir and to the generator.
Figure 3:
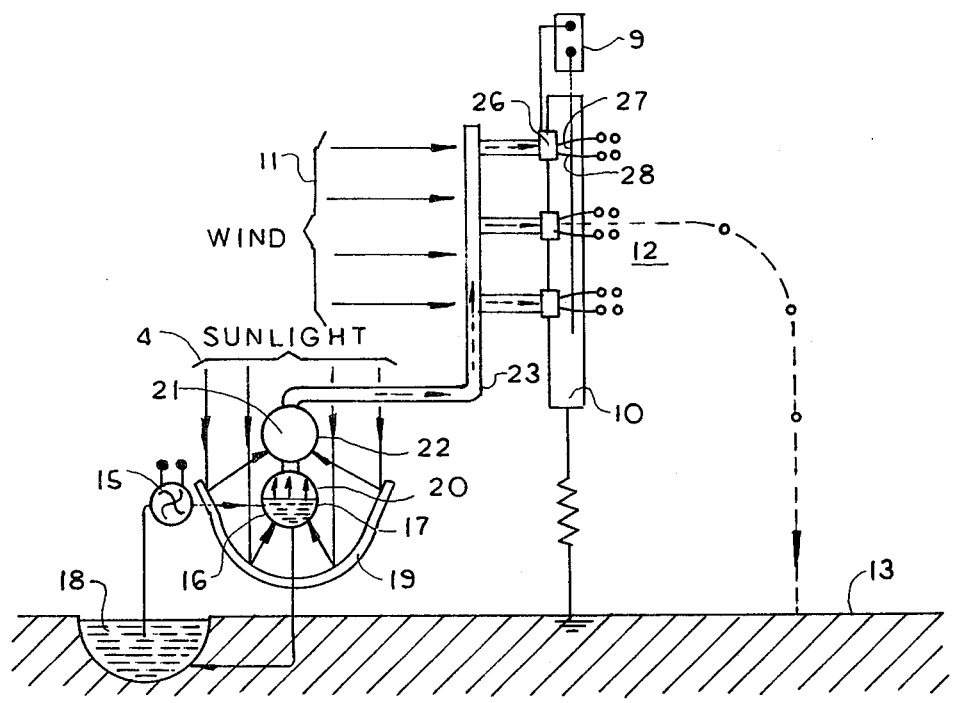
FIG. 3 shows a diagram of a Charged Aerosol Wind/Electric Power Generator using a steam condensation source to directly produce the charged aerosol, the steam source being a solar boiler-superheater.
Figure 4:
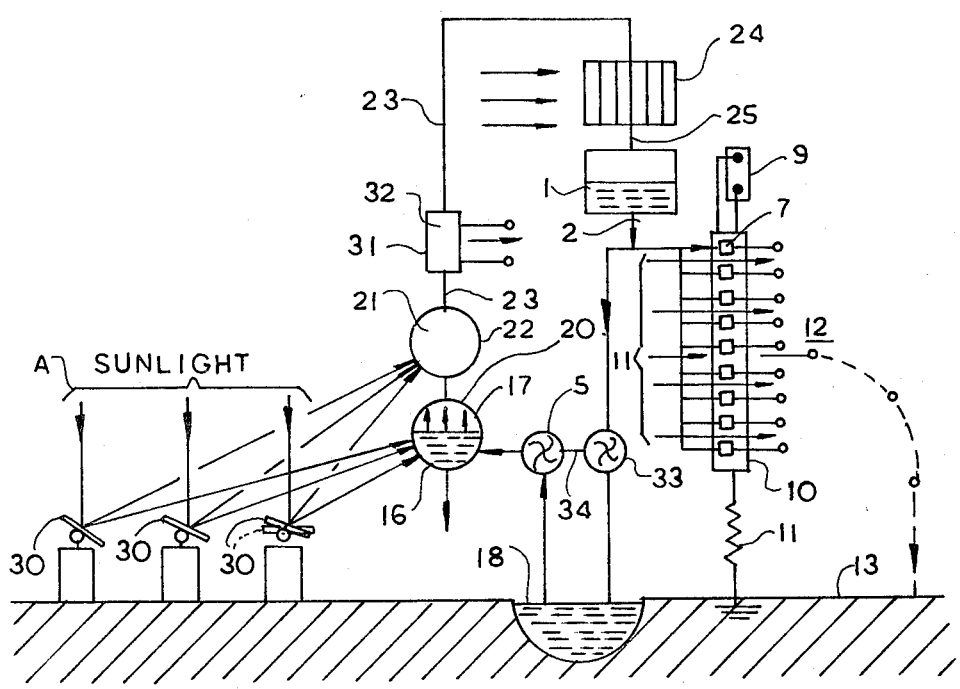
FIG. 4 shows a diagram of a Charged Aerosol Wind/Electric Power Generator using an induction charging source employing water under pressure from a reservoir elevated above the generator and mirror-heliostats focusing sunlight on a boiler-superheater to supply steam to an air-cooled condenser and a reservoir to hold condensed water at an elevation above the generator.
Figure 5:
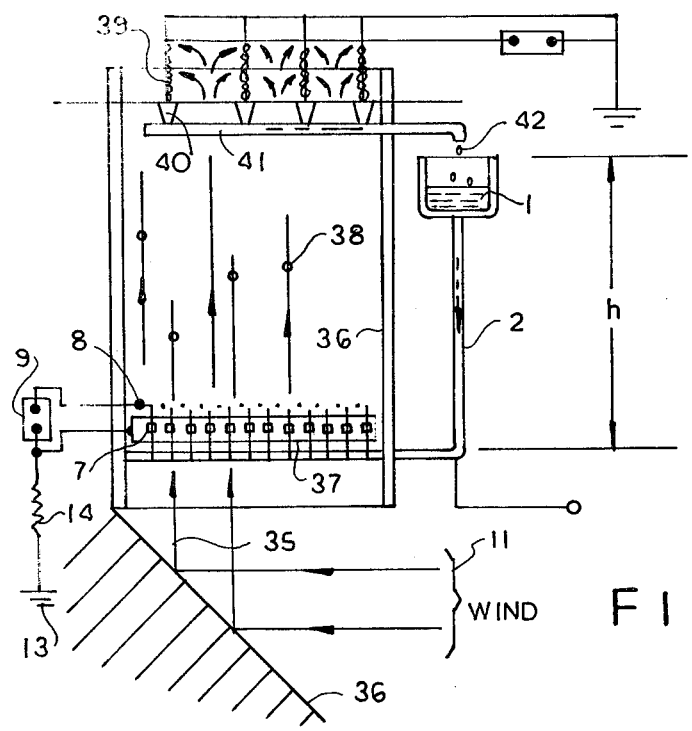
FIG. 5 shows a diagram of a Charged Aerosol Wind/Electric Power Generator using an induction charging source supplied by water under pressure from a reservoir elevated above the generator, in which charged water droplets entrained in the wind are dirven upward against the gravitational field, consolidated to form liquid water, which flows into the reservoir.
Figure 6:
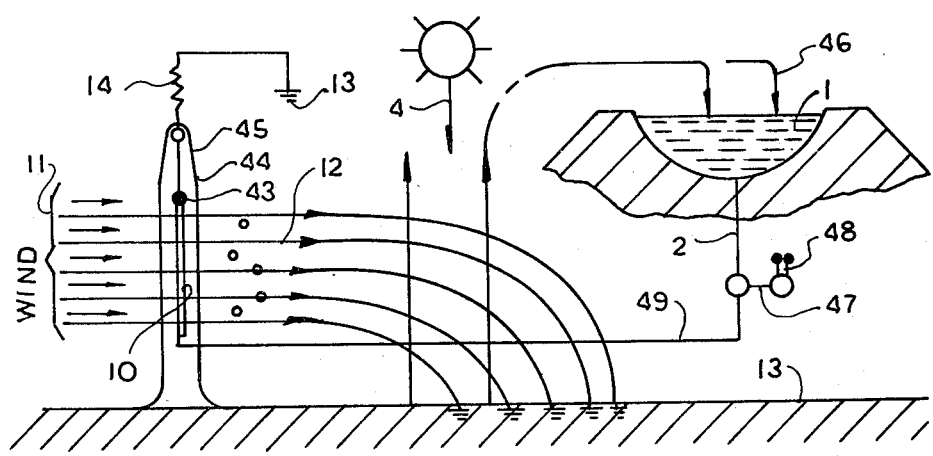
FIG. 6 shows a diagram of a Charged Aerosol Wind/Electric Power Generator using an induction charging source supplied by water under pressure from a reservoir elevated above the generator, showing a natural cycle in which the water used is circulated by the sun and the wind.
Figure 7:
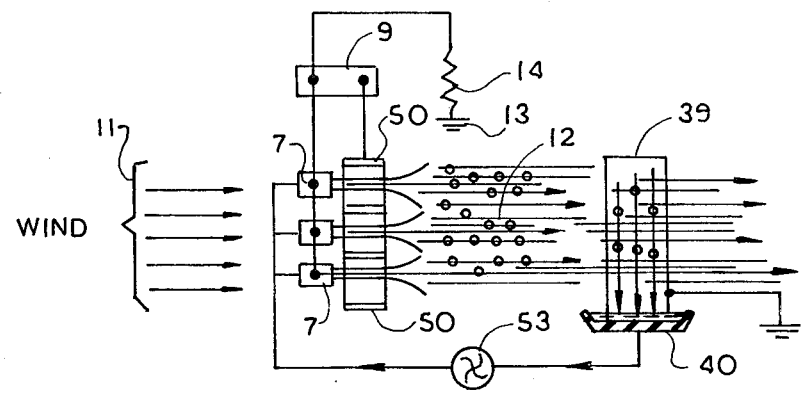
FIG. 7 shows a diagram of a side view of a Charged Aerosol Wind/Electric Power Generator having collection electrodes to discharge and consolidate the charged aerosol into a liquid.
Figure 8:
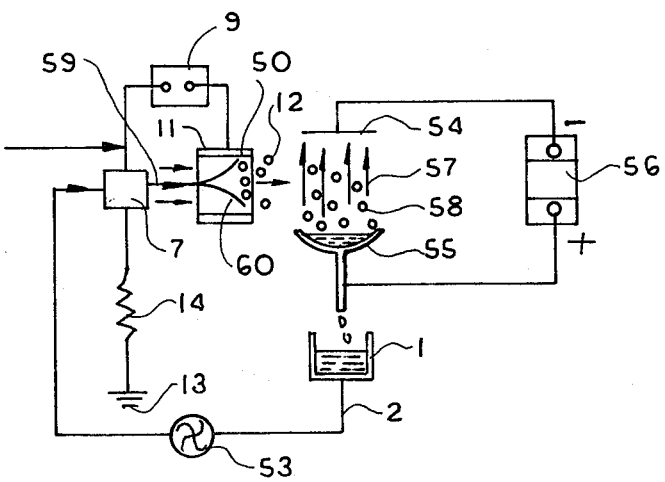
FIG. 8 shows a diagram of a side view of another Charged Aerosol Wind/Electric Power Generator having collection electrodes to discharge and consolidate the charged aerosol into a liquid in a trough.

For the same charged aerosol electrical current and power output per unit area of the power fence, water flow rate is smaller compared to the Induction Charging Method previously discussed.

FIG. 4 shows a diagram of a fourth embodiment of this invention which uses an Electrothermodynamic (ETD) Heat/Electric Power Generator between the steam source and the power fence. Sunlight 4 is focused by an array of mirror heliostats 30 onto a boiler 17—superheater 22. Water source 18 supplies water via boiler feed pump 15 to the boiler 17 which supplies steam 20 to the superheater 22, which supplies superheated steam 21 at high pressure and temperature via insulated pipe 23 to an ETD generator 31, previously described[3]. Low pressure steam 32 exhausted from the ETD generator 31 is transmitted via insulated pipe 23' to the elevated air condenser 24 where it is condensed to water 25 which flows into a reservoir 1, and thence to microorifices 7 in the power fence 10 under a pressure head n. To provide water 16 to the boiler 17, a small portion of water from reservoir 1 may be used to drive a water turbine 33 and pump 15 via coupling 34. The charged droplets may be produced by the Induction Charging Method, or alternatively, as shown in FIG. 3, superheated steam is delivered to emitters 26, producing charged aerosol droplets by condensation, using charging method 3. The wind drives the charged droplets and electric power is transduced from the wind power.

The embodiment shown in FIG. 4 shows a heat/electric power conversion system using solar power only (no wind/electric power generator). The boiler 17—superheater 22 operates the electrothermodynamic ETD generator 31, using Methods II, III, or IV, as described in copending application Ser. No. 237,290, filed Feb. 23, 1981.

In the embodiments shown in FIGS. 2–4, salt water may be used in the boiler 17. In this case, since the steam from the salt water is free of salt after evaporation in the boiler, the residual boiler water contins an increased concentration of salt which eventually flows back into the sea. In this manner, salt water may be used for land-based power fences near the sea without causing sea salt to be spread over the surrounding territory by the charged aerosol in the wind.

In the embodiment of this invention shown in FIG. 5, the wind supplies the power to lift the charged water deoplets against the gravitational field, and the wind power is converted to available hydraulic power, water is recuperated, and water pressure is regenerated. The wind 11 is redirected to a vertical wind stream 35 by the deflector wall 36. The emitter screen 37 is supported horizontally and the charged aerosol droplets 38 are directed vertically upward. The deflector wall 36 shields the upwardly directed wind stream 35. The charged water droplets 38 are carried vertically upward by the wind stream where they are collected by the grounded collector electrode 39 and drip into the gutters 40, where the water collects and returns via the pipe 41 to supply water to reservoir 1 from which water flows under pressure head h to the micro-orifices 7. The vertical wind stream 35 supplies the power to lift the charged water droplets against the gravitational field, thus converting the wind power to hydraulic power. Simultaneously, the wind power also moves he charged water droplets against the electric field and is converted to output electric power at the load 14. Water collected in the gutters 40 returns to the reservoir 1 and passes via pipe 2 to the micro-orifices 7. In this case, the hydraulic power input is free.

FIG. 6 shows a natural water recuperation and pressure regeneration scheme for a large area Wind/Electric Power Fence 10. The Power Fence 10 is suspended from a cable 43, supported by towers 44, feeding high voltage DC electric power via wires 45. The wind 11 carries the charged water droplets 12 to any distance where they discharge on the ground at 13. They may serve to irrigate a large area of land, on which crops may be grown, thus serving a dual purpose. Water evaporates as vapor due to sunlight 4, and rain water 46 eventually precipitates on a higher level body of water or reservoir 1, such as a lake. Water is withdrawn from the reservoir 1 via the pipe 2. Hydroelectric turbogenerator 47 may be employed to convert excess water power to output electric power 48. The remaining water pressure is delivered via pipe 49 to the Wind/Electric Power Fence 10.

In FIG. 7, a multi-orifice emitter 7 and a tubular exciter element 50 are the source of charged aerosol droplets 12. A grounded collector electrode 39 discharges and consolidates the charged aerosol droplets 12 to liquid water which drips into gutter 40, collecting most of the charged aerosol water droplets 12 from the wind stream, thus recuperating the available water. The charged aerosol droplets 12 are attracted to the grounded collector plates 39 where they drop off into a gutter 40 and are pumped by pump 53 back to the micro-orifices 7 at a suitable pressure of about 20 psig. The loss of head due to a height of the collector electrode may be only 1 psig. Advantages of recuperation of the charged aerosol as water at the collector electrode are: (1) the water is pumped through a maximum of only 1 m height against gravity, which requires about only 1.2 psig ($10^4$ n/m$^2$) plus the water pressure $P_r \approx 15$ psig, (2) water usage is minimized because of recuperation. FIGS. 5 to 8 inclusive show various water recuperation and pressure regeneration schemes.

Using the Induction Charging Method, the wind stream contains a comparatively small volume of water vapor at 20–100% saturation relative to a greater volume of charged aerosol water; hence, most of the water may be recovered for circulation and reuse.

FIG. 8 illustrates another water recuperation means comprising pairs of collector electrodes 54 and 55 electrically connected to a potential source 56, which provides an electric field 57. The electric field 57 provides a force on the charged droplets 12, causing them to impinge on the gutter-electrode 55. The gutter-electrode 55 collects, discharges and consolidates the charged water droplets 58 consolidating them into the liquid water in reservoir 1 from whence it is pumped by pump 53 to the micro-orifice emitter 7 issuing as a water jet 59 into the electric field 60 provided by potential source 9 between the tubular exciter electrode 50 and the emitter 7.

In the Induction Charging Method, the droplet diameter is usually about 3000 Å and the charge is adjusted to about 10 electron charges per droplet for an optimum charged aerosol at atmospheric pressure, which has a diameter to charge ratio of about 200 to 300 Å per electron charge[4].

When the charged aerosol jet breaks into charged droplets in the wind the droplet size is decreased when the surface tension is decreased[5]. The volume and the water flow rate decreases inversely according to the diameter cubed.

Thus, if for 400 w/m$^2$ electric power output from the power fence, 10 gph/m$^2$ is required for a droplet of 0.3 $\mu$m=3000 Å diameter, a droplet of 0.03 $\mu$m=300 Å will have a requirement of only 10/1000=0.01 gph/m$^2$ for the same electron charge per unit volume of water droplet.

Thus, the ratio of current/unit volume of water flow rate per unit area of the screen is increased 1000 times by a decrease of droplet diameter of only 10 times.

Another method of obtaining smaller droplet size is the condensation method 3 using a supercooled steam jet as previously described[3,9].

Still another method for obtaining smaller diameter charged water droplets employing the Induction Charging Method, is to dissolve from 0.01 to 1% of a suitable surfactant in the water. A decrease in the surface tension of the water: (1) enables better penetration of the liquid through smaller orifices, for example from 35 $\mu$m to 10 $\mu$m; (2) causes the water droplets to break into smaller droplets in an electric field; (3) results in a greater charged aerosol current per unit water flow rate.

Suitable surfactants may be organic or a fluorocarbon well known in the art. The surfactant used is preferably biodegradable.

Suitable organic surfactants are polypropylene benzyl sulphonate, known as TPBS or ABS. Biodegradable detergents such as straight chain alkyl benzene sulphanates designated as LAS or ethoxylates of primary and secondary alcohols.[6] Organic surfactants may, for example, decrease the surface tension of water from 72 dyne-cm to 35 dyne-cm, a factor of 2 times.

REFERENCES:

1. Contract No. XH-9-8128-1, Final Report "Charged Aerosol Wind/Electric Power Generator", July 1980, prepared for Solar Energy Research Institute, 1536 Cole Blvd., Golden, CO 80401.
2. Contract No. EG-77-C-01-4002, Final Report "Wind Power Charged Aerosol Generator", September 1977, prepared for U.S. Department of Energy; page 51, Superheated Steam microjet; pp 39–58.
3. Patents on Electrothermodynamics (ETD) issued to Alvin M. Marks:
   3.1 U.S. Pat. No. 2,638,555—5/12/53—Heat-Electrical Power Conversion through the Medium of a Charged Aerosol;
   3.2 U.S. Pat. No. 3,191,077—6/22/65—Power Conversion Device;
   3.3 U.S. Pat. No. 3,297,887—1/10/67—Heat-Electrical Power Transducer;
   3.4 U.S. Pat. No. 3,411,025—11/12/68—Method and Apparatus for Producing Charged Aerosols;
   3.5 U.S. Pat. No. 3,417,267—12/17/68—Heat-Electrical Power Interconversion Devices;
   3.6 U.S. Pat. No. 3,456,135—7/15/69—Gas Flywheel Power Converter;
   3.7 U.S. Pat. No. 3,518,461—6/30/70—Charged Aerosol Power Conversion Device and Method;
   3.8 U.S. Pat. No. 3,792,293—2/12/74—Generator with Charging and Collecting Arrays;
   2.9 U.S. Pat. No. 4,206,396—6/3/80—Charged Aerosol Generator with Uni-Electrode Source.
4. Marks, Alvin M., "Optimum Charged Aerosols for Power Conversion", reprinted from Journal of Applied Physics, Vol. 43, No. 1, January 1972.
5. "Fluorad Fluorochemical Surfactants", p 5 "Product Information", 1980 3M Center, St. Paul, MN 55144.
6. *Encyclopedia of Chemistry*, Second Edition, Reinhold Publishing Company, New York, article pp 314-16, "Detergents, Synthetic, Biodegradability".

Having thus fully described my invention, what I wish to claim is:

1. A charged aerosol generator and a load combination, comprising a charged liquid droplet emitter means, a gas stream, a grounded collector electrode at a distance from said emitter means, a load, said load being connected between said emitter means and said collector electrode, the said emitter means producing charged droplets which have a ratio of radius to number of electron charges of at least 100 Å per electron charge, said gas stream flowing around said emitter means and receiving said charged droplets whereby the heat/kinetic power of said gas stream is transduced to electric power at said load, and a solar source to supply power to said emitter means.

2. A charged aerosol generator and a load combination, comprising a charged liquid droplet emitter means, a gas stream, a grounded collector electrode at a distance from said emitter means, a load, said load being connected between said emitter means and said collector electrode, the said emitter means producing charged droplets which have a ratio of radius to number of electron charges of at least 100 Å per electron charge, said gas stream flowing around said emitter means and receiving said charged droplets whereby the heat/kinetic power of said gas stream is transduced to electric power at said load, and a gravitational potential power source to supply power to said emitter means.

3. A charged aerosol wind/electric power generator according to claim 1 in which said solar source supplies heat to increase the temperature of the water supplied to said emitter.

4. A charged aerosol wind/electric power generator according to claim 1 in which said solar source is a solar panel.

5. A charged aerosol wind/electric power generator according to claim 1 in which said solar source is a cylindrical reflector and linear tube boiler.

6. A charged aerosol wind/electric power generator according to claim 1 in which said solar source is a mirror controlled by a heliostat and a heat exchanger.

7. A charged aerosol wind/electric power generator according to claim 2 in which said gravitational potential power source supplies hydraulic power to said emitter.

8. In a charged aerosol wind/electric power generator according to claim 1, a boiler-superheater heated by said solar source, a condenser and a water reservoir at a level above said generator, steam from said boiler-superheater rising to said condenser, said water condensing and being supplied to said reservoir, said water thereafter being supplied to said emitter means under pressure gravitationally produced by the difference in height between said reservoir and said emitter means.

9. In a charged aerosol wind/electric power generator according to claim 2, a wall deflector, said wind being deflected by said wall deflector to a higher level, said charged aerosol droplets being entrained by said wind, means for consolidating said charged aerosol droplets to liquid water at said higher level, returning said charged aerosol to a lower level at a greater pressure, utilizing said gravitational potential power source to supply water under pressure to said emitter means, a proportion of said water being recovered for reuse.

10. In a charged aerosol wind/electric power generator according to claim 1, a collector electrode structure comprising a first collector electrode and a second collector electrode, a potential source, said potential source supplying an electric potential difference between said first and second collector electrodes, whereby said charged aerosol is deflected to said second electrode and consolidated to liquid water, a trough, said liquid water being collected in said trough from said second electrode.

11. A charged aerosol wind/electric power generator according to claim 10, said second collector electrode being grounded.

12. A charged aerosol wind/electric power generator according to claim 10, said collector electrodes being horizontal.

13. A charged aerosol wind/electric power generator according to claim 10, said second collector electrode having a trough to collect said water.

14. A charged aerosol wind/electric power generator according to claim 1 in which said charged aerosol droplets contain from 0.001 to 1% of a surfactant whereby the surface tension of said droplets is decreased, the droplet diameter is decreased and the charge to volume ratio increased, whereby the water flow rate is decreased relative to the output current per unit area, and said ratio is approximated.

15. A charged aerosol wind/electric power generator according to claim 14 in which the surfactant is an organic surfactant.

16. A charged aerosol wind/electric power generator according to claim 14 in which the said surfactant is a fluorocarbon surfactant.

17. A charged aerosol wind/electric power generator according to claim 14 in which said surfactant is biodegradable.

* * * * *